US012675356B2

(12) United States Patent
Heath et al.

(10) Patent No.: US 12,675,356 B2
(45) Date of Patent: Jul. 7, 2026

(54) DEBUG AND RECOVERY OPERATIONS FOR NON-REMOVABLE MEMORY SUB-SYSTEMS

(71) Applicant: Micron Technology, Inc., Boise, ID (US)

(72) Inventors: Nicholas Terence Heath, Pittsboro, NC (US); Gaurav Sinha, Unterschleißheim (DE)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/927,482

(22) Filed: Oct. 25, 2024

(65) Prior Publication Data

US 2025/0190304 A1 Jun. 12, 2025

Related U.S. Application Data

(60) Provisional application No. 63/607,043, filed on Dec. 6, 2023.

(51) Int. Cl.
*G06F 11/07* (2006.01)
*G06F 11/20* (2006.01)
*G06F 21/79* (2013.01)

(52) U.S. Cl.
CPC ...... *G06F 11/0778* (2013.01); *G06F 11/0727* (2013.01); *G06F 11/0775* (2013.01); *G06F 11/079* (2013.01); *G06F 11/0793* (2013.01); *G06F 11/2007* (2013.01); *G06F 21/79* (2013.01)

(58) Field of Classification Search
CPC ............. G06F 11/0727; G06F 11/0775; G06F 11/0778; G06F 11/079; G06F 11/0793; G06F 11/2007; G06F 11/201; G06F 11/2012; G06F 21/62; G06F 21/6209; G06F 21/79
See application file for complete search history.

(56) References Cited

U.S. PATENT DOCUMENTS

| | | | | |
|---|---|---|---|---|
| 2006/0075282 A1* | 4/2006 | Borkenhagen ... | G11C 29/56008 714/5.11 |
| 2009/0254999 A1* | 10/2009 | Julin ................... | G06F 11/0778 726/28 |
| 2017/0132067 A1* | 5/2017 | Singaravelu Vanaja ..................... | G06F 11/0727 |
| 2017/0139764 A1* | 5/2017 | Batchelor ................. | G06F 3/06 |
| 2018/0196949 A1* | 7/2018 | Park ...................... | H04L 9/0869 |
| 2019/0114218 A1* | 4/2019 | Yun ...................... | G06F 11/0727 |
| 2022/0187369 A1* | 6/2022 | Segev ............ | G01R 31/318536 |

(Continued)

*Primary Examiner* — Marc Duncan
*Assistant Examiner* — Albert Li
(74) *Attorney, Agent, or Firm* — Lowenstein Sandler LLP

(57) ABSTRACT

A processing device in a host system detecting a failure of a memory sub-system coupled to the host system and collects debug information from the memory sub-system via a memory sub-system interface. Responsive to determining that the debug information is not sufficient to correct the failure of the memory sub-system, the processing device performing an authentication process to authenticate the system to the memory sub-system, collects enhanced debug information from the memory sub-system via the memory sub-system interface, and performs one or more corrective actions based on the enhanced debug information to correct the failure of the memory sub-system.

20 Claims, 6 Drawing Sheets

(56) References Cited

U.S. PATENT DOCUMENTS

| 2023/0195552 A1* | 6/2023 | Jain | G06F 11/0772 |
| | | | 714/43 |
| 2024/0095125 A1* | 3/2024 | Nayak | G06F 11/0772 |

* cited by examiner

400

DEBUG AND RECOVERY OPERATIONS FOR NON-REMOVABLE MEMORY SUB-SYSTEMS

RELATED APPLICATIONS

This application claims the benefit of U.S. Provisional Patent Application No. 63/607,043, filed Dec. 6, 2023, the entire contents of which are hereby incorporated by reference herein.

TECHNICAL FIELD

Embodiments of the disclosure relate generally to memory sub-systems, and more specifically, relate to debug and recovery operations for non-removable memory sub-systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
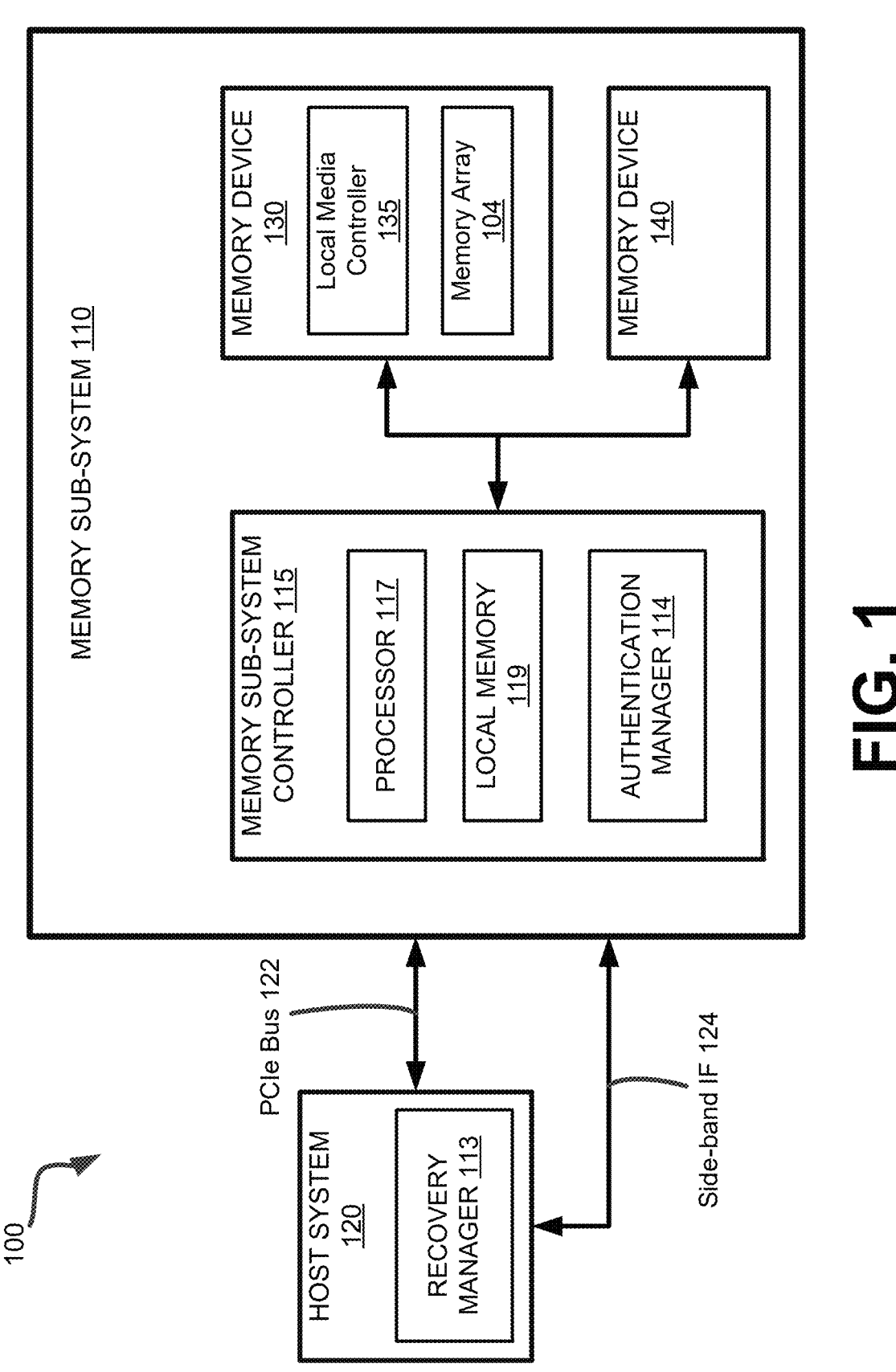
FIG. 1 illustrates an example computing system that includes a memory sub-system in accordance with some embodiments of the present disclosure.

Aspects of the present disclosure are directed to debug and recovery operations for non-removable memory sub-systems. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

One example of a memory sub-system is a solid-state drive (SSD) that includes one or more non-volatile memory devices and a memory sub-system controller to manage the non-volatile memory devices. The memory devices can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

Like any electronic circuit, a memory sub-system is susceptible to various types of errors or faults that can impact performance and/or operability. For example faults in the firmware executing on the memory sub-system can cause the memory sub-system to become unresponsive, input/output errors can prevent communication with the host system, or a failure in the non-volatile memory devices of the memory sub-system can hinder the storage or retention of data. Debugging is a methodical process of identifying and reducing the number of defects (i.e., "bugs") in a memory sub-system that cause the aforementioned error or faults. Various debug techniques can be used to detect anomalies, assess their impact, and schedule hardware changes, firmware upgrades, or full updates to the memory sub-system. The goals of debugging include identifying and fixing bugs in the system (e.g., logical or synchronization problems in the firmware, or a design error in the hardware) and collecting system state information, such as information about the operation of the memory sub-system, that may then be used to analyze the memory sub-system to find ways to recover from faults, boost its performance, or to optimize other important characteristics.

In certain systems, debugging operations or other analyses of the memory sub-system are performed on a separate computing device, such as a host computing system, communicably coupled to the memory sub-system through a communication pipe. The communication pipe can be implemented using any one of various technologies, and can include, for example, a peripheral component interconnect express (PCIe) bus, or some other type of communication mechanism. When performing debugging operations, these conventional systems transfer debugging information, such as system state information, statistics, runtime analytics, etc. from the memory sub-system to the host system over the PCIe bus. To transfer the debugging information over the PCIe bus, the data must be formatted according to a specific specification, such as the NVM Express (NVMe) specification. In addition, the transfer of the debugging information utilizes bandwidth of the PCIe bus, which then cannot be used for other memory sub-system and host operations. Certain types of faults in the memory sub-system prevent use of the PCIe bus for any communication, much less the transfer of debugging information. In some cases, the memory sub-system may be permanently integrated into some other system, such as by using a ball grid array (BGA) packaging technique to attach the memory sub-system to a printed circuit board or other substrate containing other electrical components. This so-called "non-removable" form factor is common in some embedded systems, such as automotive implementations, and may include, for example, the entire media control unit of an automobile. When the memory sub-system is permanently integrated with other components, and the PCIe bus is not available for transfer of debugging information, the only option for inspection and debugging may be to physically destroy a portion of the drive (e.g., the printed circuit board on which the components are mounted) in order to gain access to the memory sub-system. Such an approach is expensive, destructive, and should be avoided if possible. Failure to perform debugging, however, can result in inoperability of the memory sub-system, as well as the other components integrated together with the memory sub-system.

Aspects of the present disclosure address the above and other deficiencies by implementing debug and recovery operations for non-removable memory sub-systems. Responsive to an unexpected error or other fault, the memory sub-system may report an indication of the error or fault to the host system. Depending on the nature of the fault and what communication interfaces may be impacted, the indication may be transmitted either via a primary in-band interface (e.g., the PCIe bus) or via a side-band interface, such as a signal line coupled to a general-purpose input-output (GPIO) pin of the memory sub-system, and which is physically separated from the in-band interface. If at least one communication interface is functional, the host system, or some other computing device (e.g., test equipment which can be coupled to the functional interface), can request and receive certain debug information (e.g., event logs, vendor specific logs, self-monitoring and reporting technology logs, etc.) from the memory sub-system. Using this debug information, the host system or other computing device can perform a failure analysis and corresponding debug operations to attempt to correct the error or fault in the memory sub-system. If the received debug information is insufficient (i.e., if the host system or other computing device cannot remedy the error or fault based on the information provided), the host system or other computing device can authenticate itself to the memory sub-system in order to gain access to enhanced debug information on the memory sub-system. Depending on the embodiment, the authentication process can take various forms, such as providing a password or other security key, use of a cryptographic certificate scheme, establishing a secure communication session using a hardware security module, etc. Once the host system or other computing device is authenticated, the memory sub-system can grant access to the enhanced debug information (e.g., additional log data, memory device state information, other proprietary data), which can be accessed via either the in-band interface or the side-band interface. Using this enhanced debug information, the host system or other computing device can perform a failure analysis and corresponding debug operations to attempt to correct the error or fault in the memory sub-system.

Advantages of the approach described herein includes, but is not limited to, improved debugging in the memory sub-system. By providing an authenticated host system or other computing device access to enhanced debugging information, certain errors and faults in the memory sub-system can be corrected while the memory sub-system remains integrated into some other system. There is no need to physically remove the memory sub-system so that debugging operations can be performed, which prevents physical damage or destruction of the system. In addition, more accurate debug operations can be performed since the exact conditions under which the fault occurred are maintained.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., one or more memory device(s) 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface 122. Examples of a physical host interface 122 include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface 122 can be used to transmit data between the host system 120 and the memory sub-system 110. The host system 120 can further utilize an NVM Express (NVMe) interface to access the memory components (e.g., the one or more memory device(s) 130) when the memory sub-system 110 is coupled with the host system 120 by the PCIe interface. The physical host interface 122 can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory device(s) 130. The memory sub-system controller 115 can further include host interface circuitry to communicate with the host system 120 via the physical host interface 122. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115)

can externally manage the memory device 130 (e.g., perform media management operations on the memory device(s) 130). In some embodiments, a memory device 130 is a managed memory device, which is a raw memory device (e.g., memory array 104) having control logic (e.g., local controller 135) for media management within the same memory device package. An example of a managed memory device is a managed NAND (MNAND) device. Memory device(s) 130, for example, can each represent a single die having some control logic (e.g., local media controller 135) embodied thereon. In some embodiments, one or more components of memory sub-system 110 can be omitted.

In one embodiment, the host system 120 includes a recovery manager component 113 that coordinates the retrieval of debug information from memory sub-system 110 and performs debug operations and corrective actions to cure faults and errors that occur in memory sub-system 110. Depending on the embodiment, recovery manager component 113 can collect debug information from memory sub-system 110 over primary physical host interface 122 or over a side-band interface 124, which is separate from the primary physical host interface 122. If the initial debug information is not sufficient to cure the faults or errors, recovery manager 113 can authenticate host system 120 to memory sub-system 110 in order to obtain access to enhanced debug information from memory sub-system 110. In one embodiment, memory sub-system controller 115 includes an authentication manager 114 which manages the authentication of host system 120. As described in more detail below, the enhanced debug information can include additional log data, memory device state information, and/or other proprietary data, which is not normally available to unauthenticated requestors. Further details with regard to the operations of the recovery manager 113 and authentication manager 114 are described below.

Figure 2:
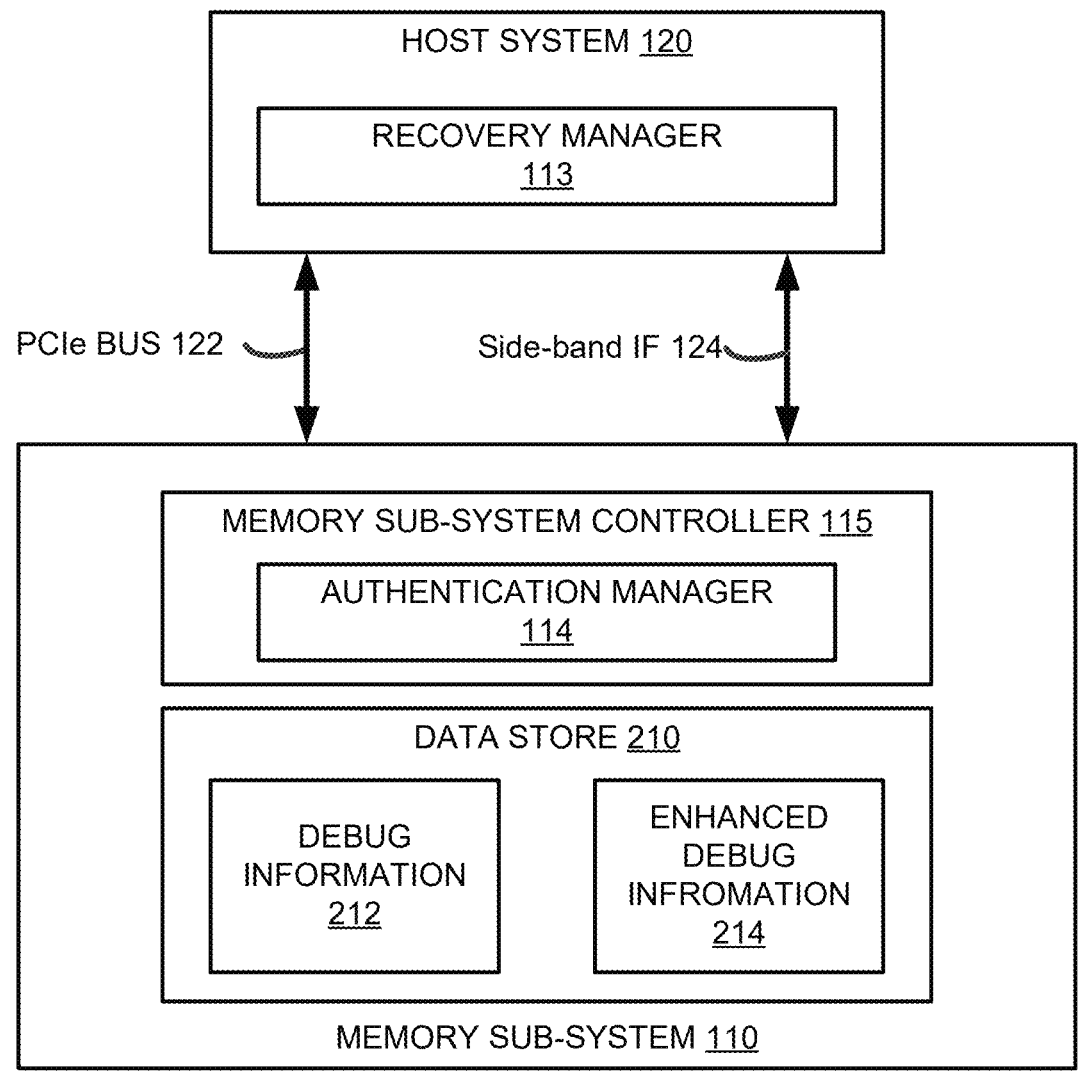
FIG. 2 is a block diagram illustrating a computing system for debugging and recovery operations for non-removable memory sub-systems in accordance with some embodiments of the present disclosure.

FIG. 2 is a block diagram illustrating a computing system for debug and recovery operations for non-removable memory sub-systems in accordance with some embodiments of the present disclosure. In one embodiment, host system 120 is coupled to memory sub-system 110 by physical host interface 122 (e.g., a PCIe bus) and by a side-band interface 124. Host system 120 may include respective bus ports for each interface, as well as corresponding interface drivers. These interface drivers can provide programming interfaces to control and manage the signals sent at the corresponding ports. Host system 120 may further include a host operating system and or one or more customer applications running on top of the host operating system that can access the hardware functions of bus ports (e.g., to send and receive data) via the corresponding drivers. For example, the host operating system or customer applications can invoke a routine in either driver, which in turn can issue a corresponding command or commands to the associated port. As described above, host system 120 includes recovery manager 113, which can perform debug and recovery operations for memory sub-system 110. In one embodiment, recovery manager 113 can request and receive debug information 212 from the memory sub-system. Debug information 212 can include, for example, event logs, vendor specific logs, self-monitoring and reporting technology logs, etc. Depending on which communication interfaces remain functional, recovery manager 113 can obtain the debug information 212 via in-band interface 122 or via side-band interface 124. Using debug information 212, recovery manager 113 can perform a failure analysis and corresponding debug operations to attempt to correct an error or fault in the memory sub-system 110. In one embodiment, recovery manager 113 can be present in some other computing device (e.g., test equipment or dedicated debug equipment) that is coupled to memory sub-system 110 in a similar fashion as host system 120.

If the received debug information 212 is insufficient (i.e., if recovery manager 113 cannot remedy the error or fault based on debug information 212), the recovery manager 113 can authenticate host system 120 to the memory sub-system 110 in order to gain access to enhanced debug information 214 on the memory sub-system. The manner in which host system 120 is authenticated can vary depending on the embodiment, but can include for example, use of password or other security key, use of a cryptographic certificate scheme, establishing a secure communication session using a hardware security module, etc.

In one embodiment, the memory sub-system 110 also includes respective bus ports to which PCIe bus 122 and the side-band interface 124 are coupled. As in host system 120, the bus ports in memory sub-system 110 can be controlled by corresponding device drivers. As described above, memory sub-system controller 115 includes authentication manager 113, which can control the authentication of the host system 120 or other computing device attempting to access enhanced debug information 214 stored in data store 210. Data store 210 can include one of local memory 119, memory device 130, or memory device 140, as described above with respect to FIG. 1. Once the host system or other computing device is authenticated (e.g., by authentication manager 113), the memory sub-system 110 can grant access to the enhanced debug information 214 which can be accessed via either the in-band interface 122 or the side-band interface 124. The enhanced debug information 214 can include, for example, additional log data, memory device state information, or other proprietary data. Using this enhanced debug information 214, recovery manager 13 can perform a failure analysis and corresponding debug operations to attempt to correct the error or fault in the memory sub-system 110.

Figure 3A:
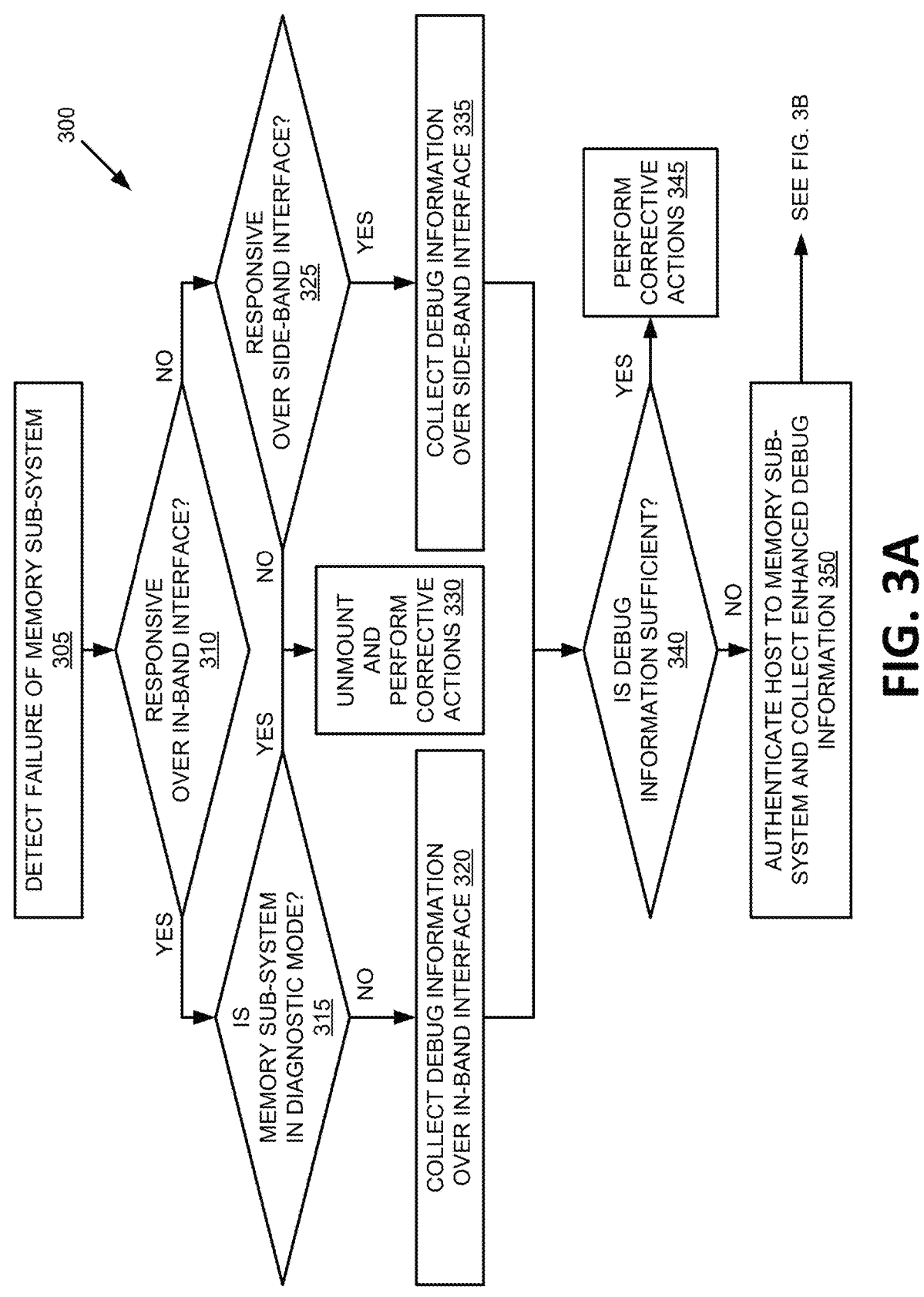
FIGS. 3A-3B are flow diagrams of an example method host system operations for debug and recovery of a non-removable memory sub-system in accordance with some embodiments of the present disclosure.
Figure 3B:
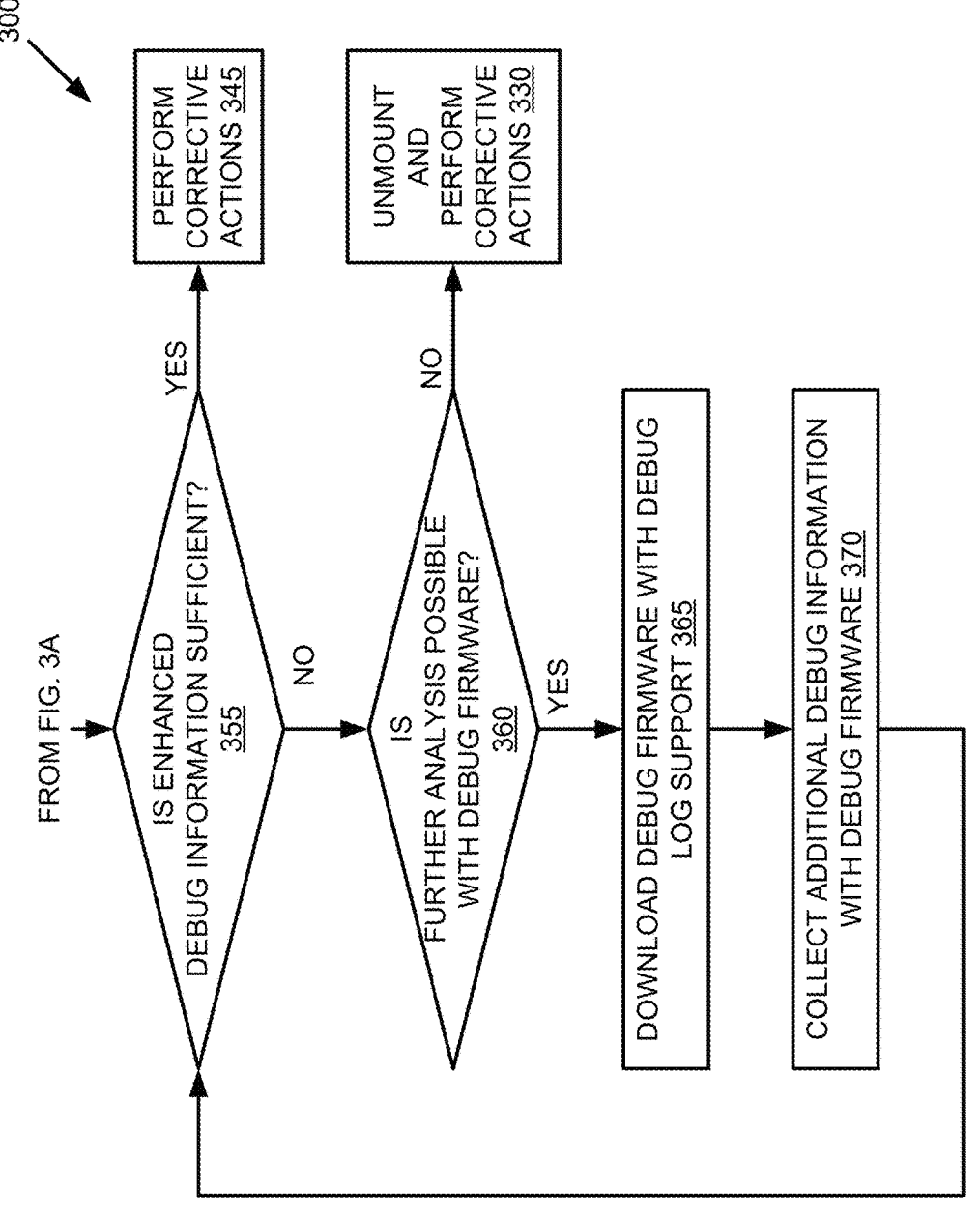

FIGS. 3A-3B are flow diagrams of an example method host system operations for debug and recovery of a non-removable memory sub-system in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by recovery manager component 113 of FIG. 1 and FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing logic (e.g., recovery manager component 113) detects a failure of a memory sub-system 110 coupled to a host system 120, or other computing device, via a memory sub-system interface. In one embodiment, the host system 120 is coupled to memory sub-system 110 by a primary in-band interface 122 (e.g., a PCIe bus) and by a side-band interface 124, that is physically separate from the in-band interface 122. The recovery manager component 113 can detect the failure (e.g., a fault or error) in a number of ways, such as by receiving a notification of the failure from memory sub-system 110, or by determining that the memory sub-system 110 has been unresponsive for a period of time.

At operation 310, the processing logic determines whether the memory sub-system 110 is responsive via the primary in-band interface 122. For example, the recovery manager 113 can attempt to send one or more requests or commands to the memory sub-system 110 and monitor the primary in-band interface 122 for a response. If a response is received, this can be indicative that the primary in-band interface 122 is functional and that the memory sub-system 110 is responsive. If, however, a response is expected, but is not received, this can indicate that the primary in-band interface 122 is non-functional and that the memory sub-system 110 is unresponsive.

Responsive to determining that the memory sub-system is responsive via the primary in-band interface, at operation 315, the processing logic determines whether the memory sub-system 110 is in a special diagnostic mode (e.g., a ROM mode) or stuck in the initial boot sequence. In some instances, the memory sub-system 110 may not be able to load the firmware properly and thus, may need to be restarted in the special diagnostic mode for debug purposes. The diagnostic mode can offer limited functionality as compared to a normal operational mode but can be useful performing debugging operations. In one embodiment, the recovery manager 113 can query the memory sub-system 110 for the current mode of operation and can thus determine whether the memory sub-system is in the diagnostic mode.

Responsive to determining that the memory sub-system is not in the special diagnostic mode, at operation 320, the processing logic collects debug information, such as debug information 212, from the memory sub-system 110 via the primary in-band interface 122. In one embodiment, the debug information 212 comprises one or more event log data, vendor specific log data, or self-monitoring and reporting technology log data from the memory sub-system 110. Access to this debug information 212 is not normally restricted and any requestor can access debug information 212 without specific authentication being required.

Responsive to determining that the memory sub-system is not responsive via the primary in-band interface, at operation 325, the processing logic determines whether the memory sub-system 110 is responsive via the secondary side-band interface 124. For example, the recovery manager 113 can attempt to send one or more requests or commands to the memory sub-system 110 and monitor the secondary side-band interface 124 for a response. If a response is received, this can be indicative that the secondary side-band interface 124 is functional and that the memory sub-system 110 is responsive. If, however, a response is expected, but is not received, this can indicate that the secondary side-band interface 124 is non-functional and that the memory sub-system 110 is unresponsive.

Responsive to determining that the memory sub-system is not responsive via the secondary side-band interface or responsive to determining that the memory sub-system is in the special diagnostic mod, at operation 330, the processing logic unmounts the memory sub-system 110 and performs one or more corrective actions to correct the failure of the memory sub-system 110. In some cases, the memory sub-system 110 may be permanently integrated with the host system 120, such as by using a ball grid array (BGA) packaging technique. When the memory sub-system 110 is permanently integrated with other components, and neither memory sub-system interface is available for transfer of debugging information, the only option for inspection and debugging may be to physically destroy the packaging in order to gain access to the memory sub-system 110. This physical removal of the memory sub-system 110 can be referred to as unmounting.

Responsive to determining that the memory sub-system is responsive via the secondary side-band interface, at operation 335, the processing logic collects the debug information 212 from the memory sub-system via the secondary side-band interface 124.

At operation 340, the processing logic determines whether the debug information 212 is sufficient to correct or at least identify a root cause of the failure of the memory sub-system 110. In one embodiment, log data, such as device health logs (e.g., SMART logs), vendor specific Extended SMART logs (i.e., containing various information like NAND Program/Erase cycles, etc.), and other vendor logs are collected. If these logs are not sufficient to determine the root cause of the failure, then enhanced debug logs may be needed. As a part of the enhanced debug logs, vendor proprietary logs which are not typically available for access by the customer may be retrieved, including Program/Erase cycle (NAND cycling) information of each NAND Super-block, distribution of the threshold voltage, etc. In addition, there can be more logs related to firm states, NAND states, etc., which are typically not available that can be retrieved.

Responsive to determining that the debug information 212 is sufficient to correct or at least identify the root cause of the failure of the memory sub-system 110, at operation 345, the processing logic performs one or more corrective actions based on the debug information 212 to correct the failure of the memory sub-system 110. These corrective actions can vary depending on the embodiments, as well as on the nature of the fault or error that cause the failure, but can include for example, recovery operations to recover data stored on the memory devices of memory sub-system 110, the removal of latent effects caused by the memory sub-system 110, updating firmware on the memory sub-system 110, various testing operations, etc.

Responsive to determining that the debug information 212 is not sufficient to correct or at least identify the root cause of the failure of the memory sub-system 110, at operation 350, the processing logic performs an authentication process to authenticate the requestor (e.g., host system 120 or other computing device) to the memory sub-system 110 and collects enhanced debug information 214 from the memory sub-system 110 via either the primary in-band interface 122 or the secondary side-band interface 124. In one embodiment, the enhanced debug information 214 comprises one or more of log data or memory device state information from the memory sub-system 110, and which is not accessible to unauthenticated requestors. In order to access the enhanced debug information 214, the requestor can perform the authentication process which can include, for example, providing a password or security key, providing a cryptographic certificate, establishing a secure communication session with the memory sub-system 110 interface using a hardware security module, etc.

Referring now to FIG. 3B, at operation 355, the processing logic determines whether the enhanced debug information 214 is sufficient to correct or at least identify the root cause of the failure of the memory sub-system 110. If so, the processing logic can proceed to operation 345 and perform one or more corrective actions based on the enhanced debug information 214 to correct the failure of the memory sub-system 110. In one embodiment, if the logs obtained so far, such as the logs accessible without security authentication and the logs accessible upon security authentication, are not sufficient to determine the root cause of the failure then, on a case by case basis, the processing logic may capture more details which are currently not being saved by the firmware available on the failing memory sub-system. In this case, the failure analysis may utilize some logging/traces to be added in the firmware code to get further insight into the failure. This path can include adding some extra logging/traces/ debug information support in the debug firmware, then downloading this debug firmware to the device, and capturing the extra logs from the debug firmware. The debug firmware might be helpful to get some insight into the failure but may not be conclusive to find the exact root cause, so another new debug firmware with even more logging enabled may be used. This process of adding further debug support may be repeated until the root cause is understood or a point is reached where an analysis team thinks that all the required information needed for the current issue has been retrieved and any further analysis really requires a physical analysis, which would involve the memory sub-system being physically removed.

Responsive to determining that the enhanced debug information 214 is not sufficient to correct or at least identify the root cause of the failure of the memory sub-system 110, at operation 360, the processing logic determines whether further failure analysis is possible with debug firmware. In one embodiment, the captured log is shared with a failure analysis team. The team may involve a controller and firmware (FW) team who have access to the source code. With the collected log data, the FW team may cross check in the Firmware source code that identify what's happening in the source code flow that results in failure if the memory sub-system. If successful, then they would conclude that the issue is understood. They can make a bug fix and provide a FW update that has this fix to the customer to help recover the memory sub-system in the field. Alternatively, if the FW team thinks the logs are not sufficient to confirm the root cause then they may add some extra logs in the FW source code, then generate a debug FW binary to be used again for collecting the logs. The process may be repetitive and the operation 370 may have multiple sub steps (e.g., power cycle the drive→allow the SSD to boot with debug FW→then once the failure is recreated collect the logs). If the enhanced debug information 214 is not sufficient, the processing logic can proceed to operation 330 and unmount the memory sub-system 110 and perform one or more corrective actions to correct the failure of the memory sub-system 110.

Responsive to determining that further failure analysis is possible with the debug firmware, at operation 365, the processing logic downloads the debug firmware with debug log support.

At operation 370, the processing logic collects additional debug information using the debug firmware and returns to operation 355 to determine if the additional debug information is sufficient to correct the failure of the memory sub-system 110.

Figure 4:
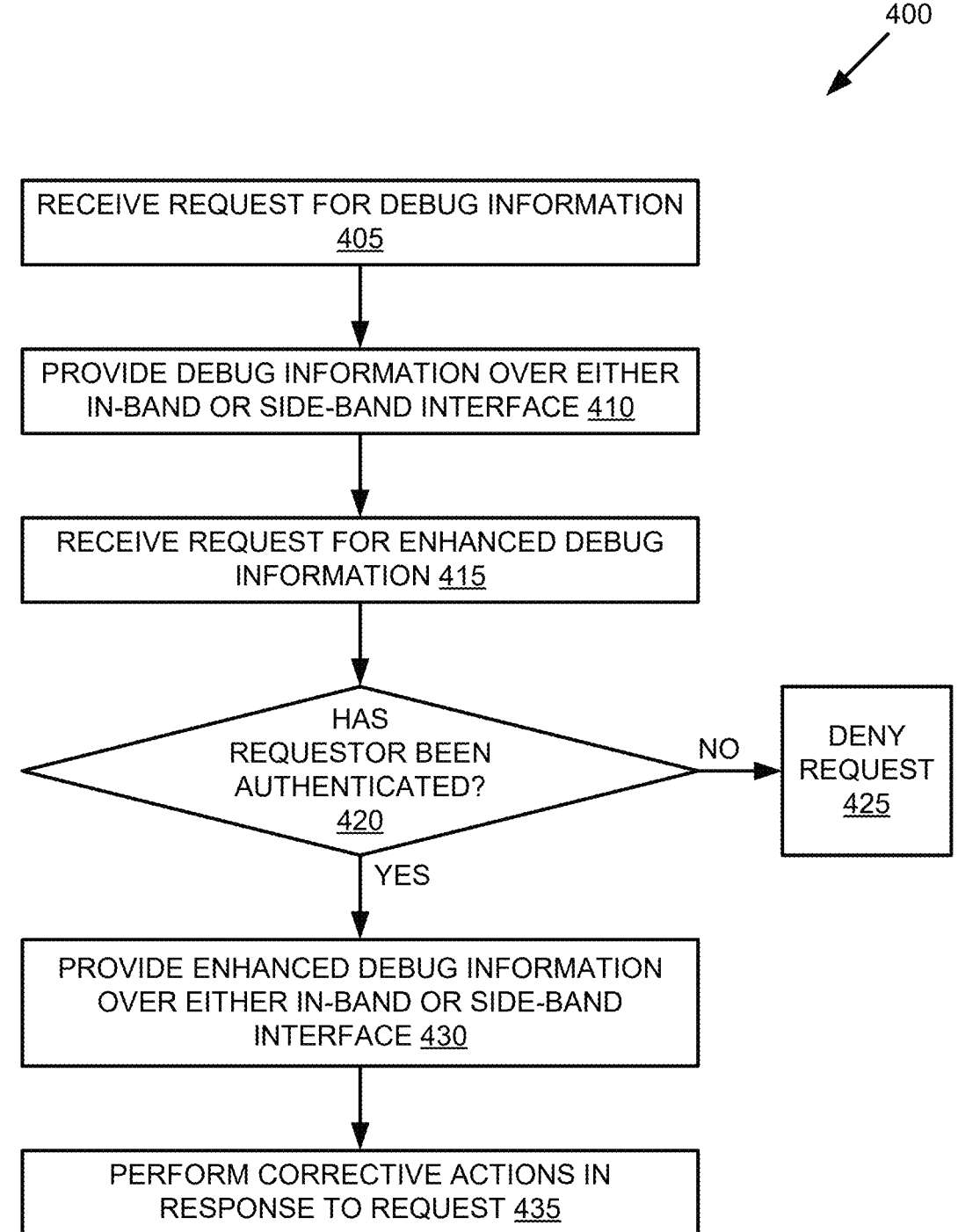
FIG. 4 is a flow diagram of an example method memory sub-system operations for debug and recovery of a non-removable memory sub-system in accordance with some embodiments of the present disclosure.

FIG. 4 is a flow diagram of an example method memory sub-system operations for debug and recovery of a non-removable memory sub-system in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by authentication manager 114 of FIG. 1 and FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, the processing logic (e.g., authentication manager 114) receives a request from a requestor for debug information related to a failure of the memory sub-system 110. Depending on the embodiment, the request can be received from host system 120 or some other computing device (e.g., a dedicated test device or other piece of equipment). The requestor can send the request, for example, in response to detecting a failure of the memory sub-system 110. In one embodiment, the requestor is coupled to memory sub-system 110 by a primary in-band interface 122 (e.g., a PCIe bus) and by a side-band interface 124, that is physically separate from the in-band interface 122. The requestor can detect the failure (e.g., a fault or error) in a number of ways, such as by receiving a notification of the failure from memory sub-system 110, or by determining that the memory sub-system 110 has been unresponsive for a period of time.

At operation 410, the processing logic provides the requested debug information to the requestor via either the primary in-band interface 122 or the secondary side-band interface 124. In one embodiment, the debug information 212 comprises one or more of event log data, vendor specific log data, or self-monitoring and reporting technology log data from the memory sub-system 110. Access to this debug information 212 is not normally restricted and any requestor can access debug information 212 without specific authentication being required.

At operation 415, the processing logic receives a request from the requestor for enhanced debug information related to the failure. For example, if the requestor determines that the debug information 212 is not sufficient to correct the failure of the memory sub-system 110, the requestor may issue the request for additional enhanced debug information 214.

At operation 420, the processing logic determines whether the requestor has been properly authenticated. Since enhanced debug information 214 is not accessible to unauthenticated requestors, the authentication manager 114 can first verify whether the requestor has been authenticated. Responsive to determining that the requestor has not been properly authenticated, at operation 425, the processing logic denies the request. In one embodiment, the authentication manager 114 can attempt to authenticate the requestor via an authentication process prior to or in addition to denying the request. The authentication process can include, for example, providing a password or security key, providing a cryptographic certificate, establishing a secure communication session with the memory sub-system 110 interface using a hardware security module, etc.

Responsive to determining that the requestor has been properly authenticated, at operation 430, the processing logic provides the requested enhanced debug information 214 to the requestor via either the primary in-band interface 122 or the secondary side-band interface 124. In one embodiment, the enhanced debug information 214 comprises one or more of log data or memory device state information from the memory sub-system 110.

At operation 435, the processing logic performs one or more corrective actions in response to a command or request from the requestor to correct the failure of the memory sub-system 110. These corrective actions can vary depending on the embodiments, as well as on the nature of the fault or error that cause the failure, but can include for example, recovery operations to recover data stored on the memory devices of memory sub-system 110, the removal of latent effects caused by the memory sub-system 110, updating firmware on the memory sub-system 110, various testing operations, etc.

Figure 5:
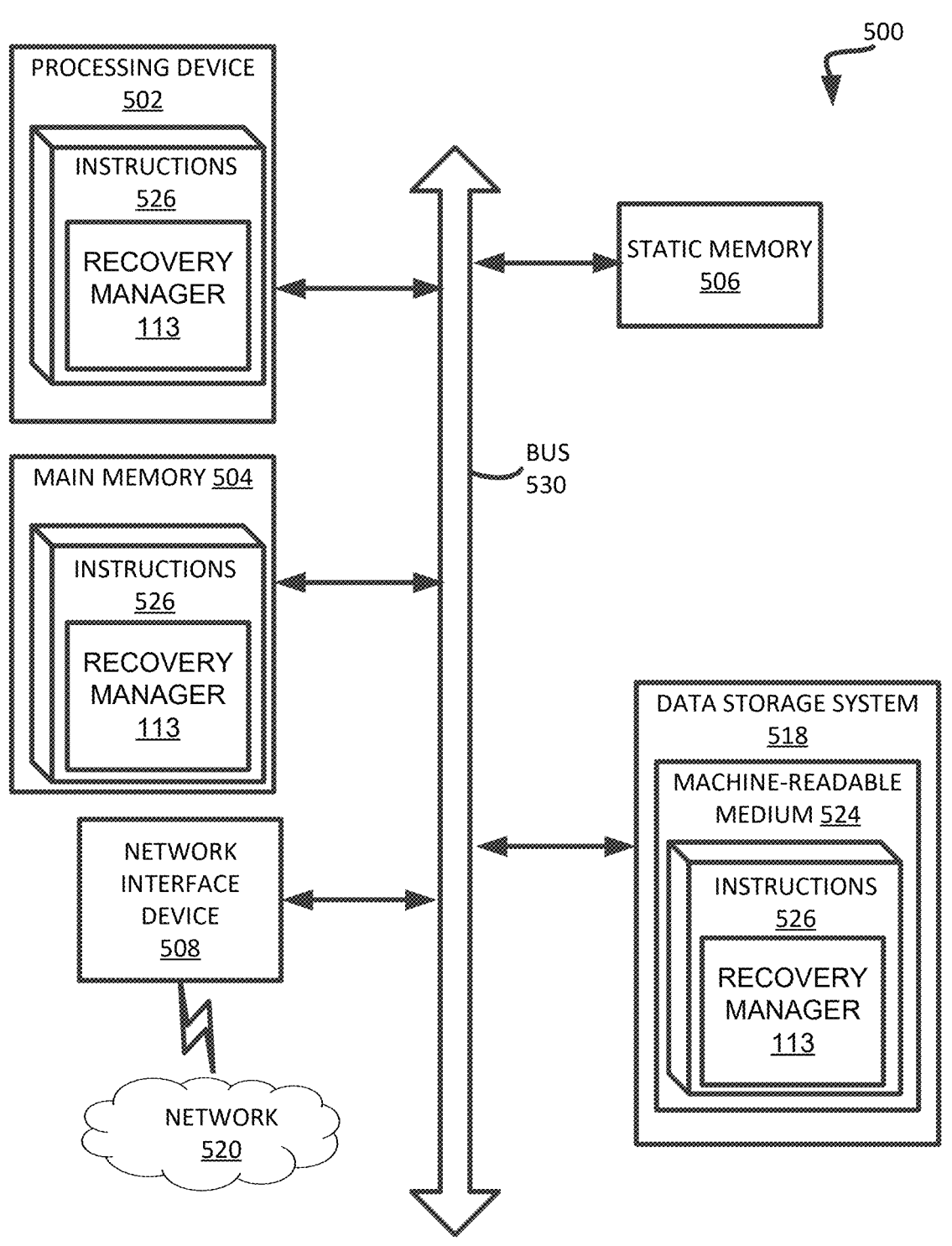
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1 and configured to perform operations corresponding to recovery manager component 113) that includes, is coupled to, or utilizes a memory sub-system (e.g., the memory sub-system 110 of FIG. 1) or can be used to perform the operations of a controller (e.g., to execute an operating system to perform operations corresponding to the authentication manager 114 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to the recovery manager component 113 or the authentication manager 114 of FIG. 1. While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory sub-system interface; and
a processing device, operatively coupled with the memory sub-system interface, to perform operations comprising:
    detecting a failure of a memory sub-system coupled to the memory sub-system interface;
    collecting debug information from the memory sub-system via the memory sub-system interface;
    determining whether the debug information is sufficient to correct the failure of the memory sub-system; and
    responsive to determining that the debug information is not sufficient to correct the failure of the memory sub-system:
        performing an authentication process to authenticate the system to the memory sub-system; and
        collecting enhanced debug information from the memory sub-system via the memory sub-system interface.

2. The system of claim 1, wherein the processing device is to perform operations further comprising:
    performing one or more corrective actions based on the enhanced debug information to correct the failure of the memory sub-system.

3. The system of claim 1, wherein the memory sub-system interface comprises a primary in-band interface and a secondary side-band interface, each coupled between the system and the memory sub-system, and wherein the processing device is to perform operations further comprising:
    determining whether the memory sub-system is responsive via the primary in-band interface; and
    responsive to determining that the memory sub-system is responsive via the primary in-band interface, collecting the debug information from the memory sub-system via the primary in-band interface.

4. The system of claim 3, wherein the processing device is to perform operations further comprising:
    responsive to determining that the memory sub-system is not responsive via the primary in-band interface, determining whether the memory sub-system is responsive via the secondary side-band interface; and
    responsive to determining that the memory sub-system is responsive via the secondary side-band interface, collecting the debug information from the memory sub-system via the secondary side-band interface.

5. The system of claim 4, wherein the processing device is to perform operations further comprising:
    responsive to determining that the debug information is sufficient to correct the failure of the memory sub-system, performing one or more corrective actions based on the debug information to correct the failure of the memory sub-system.

6. The system of claim 1, wherein the debug information comprises one or more of event log data, vendor specific log data, or self-monitoring and reporting technology log data from the memory sub-system.

7. The system of claim 1, wherein the enhanced debug information comprises one or more of log data or memory device state information from the memory sub-system and which is not accessible to unauthenticated requestors.

8. The system of claim 1, wherein performing the authentication process to authenticate the system to the memory sub-system comprises one or more of providing a password or security key, providing a cryptographic certificate, or establishing a secure communication session with the memory sub-system interface using a hardware security module.

9. A method comprising:
    detecting a failure of a memory sub-system coupled to a host system via a memory sub-system interface;
    collecting debug information from the memory sub-system via the memory sub-system interface;
    determining whether the debug information is sufficient to correct the failure of the memory sub-system; and
    responsive to determining that the debug information is not sufficient to correct the failure of the memory sub-system:
        performing an authentication process to authenticate the host system to the memory sub-system; and
        collecting enhanced debug information from the memory sub-system via the memory sub-system interface.

10. The method of claim 9, further comprising:
    performing one or more corrective actions based on the enhanced debug information to correct the failure of the memory sub-system.

11. The method of claim 9, wherein the memory sub-system interface comprises a primary in-band interface and a secondary side-band interface, each coupled between the host system and the memory sub-system, and the method further comprising:
    determining whether the memory sub-system is responsive via the primary in-band interface; and
    responsive to determining that the memory sub-system is responsive via the primary in-band interface, collecting the debug information from the memory sub-system via the primary in-band interface.

12. The method of claim 11, further comprising:
    responsive to determining that the memory sub-system is not responsive via the primary in-band interface, determining whether the memory sub-system is responsive via the secondary side-band interface; and responsive to determining that the memory sub-system is responsive via the secondary side-band interface, collecting the debug information from the memory sub-system via the secondary side-band interface.

13. The method of claim 12, further comprising:

responsive to determining that the debug information is sufficient to correct the failure of the memory sub-system, performing one or more corrective actions based on the debug information to correct the failure of the memory sub-system.

14. The method of claim 9, wherein the debug information comprises one or more of event log data, vendor specific log data, or self-monitoring and reporting technology log data from the memory sub-system.

15. The method of claim 9, wherein the enhanced debug information comprises one or more of log data or memory device state information from the memory sub-system and which is not accessible to unauthenticated requestors.

16. The method of claim 9, wherein performing the authentication process to authenticate the host system to the memory sub-system comprises one or more of providing a password or security key, providing a cryptographic certificate, or establishing a secure communication session with the memory sub-system interface using a hardware security module.

17. A non-transitory computer-readable storage medium comprising instructions that, when executed by a processing device, cause the processing device to perform operations comprising:

detecting a failure of a memory sub-system coupled to a host system via a memory sub-system interface;

collecting debug information from the memory sub-system via the memory sub-system interface;

determining whether the debug information is sufficient to correct the failure of the memory sub-system; and responsive to determining that the debug information is not sufficient to correct the failure of the memory sub-system:

performing an authentication process to authenticate the host system to the memory sub-system;

collecting enhanced debug information from the memory sub-system via the memory sub-system interface; and performing one or more corrective actions based on the enhanced debug information to correct the failure of the memory sub-system.

18. The non-transitory computer-readable storage medium of claim 17, wherein the memory sub-system interface comprises a primary in-band interface and a secondary side-band interface, each coupled between the host system and the memory sub-system, and the instructions cause the processing device to perform operations further comprising:

determining whether the memory sub-system is responsive via the primary in-band interface; and responsive to determining that the memory sub-system is responsive via the primary in-band interface, collecting the debug information from the memory sub-system via the primary in-band interface.

19. The non-transitory computer-readable storage medium of claim 18, wherein the instructions cause the processing device to perform operations further comprising:

responsive to determining that the memory sub-system is not responsive via the primary in-band interface, determining whether the memory sub-system is responsive via the secondary side-band interface; and responsive to determining that the memory sub-system is responsive via the secondary side-band interface, collecting the debug information from the memory sub-system via the secondary side-band interface.

20. The non-transitory computer-readable storage medium of claim 17, wherein the debug information comprises one or more of event log data, vendor specific log data, or self-monitoring and reporting technology log data from the memory sub-system, and wherein the enhanced debug information comprises one or more of log data or memory device state information from the memory sub-system and which is not accessible to unauthenticated requestors.

* * * * *